June 7, 1927.
A. JOHNSON
SAW SET
Filed June 10, 1926
1,631,534
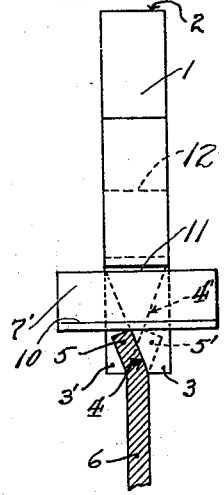
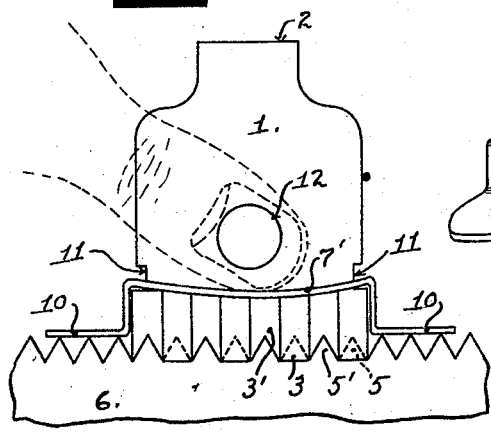
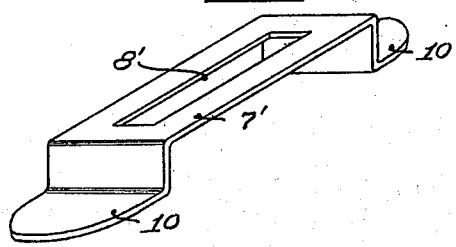
INVENTOR
Axel Johnson
BY Harry F. Totten
ATTORNEY Patented June 7, 1927.

1,631,534

UNITED STATES PATENT OFFICE.

AXEL JOHNSON, OF OAKLAND, CALIFORNIA.

SAW SET.

Application filed June 10, 1926. Serial No. 115,142.

The present invention relates to saw-sets of the hand-operated swage type.

One of the objects of the invention is to provide a simple, inexpensive, and easily operated saw-set which can be used successfully by any mechanic without skill and experience in the art of setting saws. Another object is to provide a simple gage associated with the setting tool, to insure accuracy of result throughout the entire length of the saw, without damage to its teeth.

With these and other objects in view, typical embodiments of the invention will be hereinafter described, with the understanding that the form, proportion, and arrangement of the several parts may be varied, within the limits of the claims hereto appended, without departing from the spirit of the invention as set forth in said claims.

Referring to the accompanying drawings.

Fig. 1 is an end elevation, enlarged, showing the relation of the tool to the saw teeth;

Fig. 2 is a similar view of a tool having a preferred form of gage associated therewith; and Fig. 3 is a perspective view of the preferred form of gage shown in Fig. 2.

In the drawings, the reference numeral 1 designates the body of the setting tool, which is formed of suitable steel capable of being hardened, and which is provided with an upper face or head 2 adapted to be struck by a hammer. The tool is relatively thin in proportion to its width, as shown, and its lower edge is formed with a plurality of oppositely inclined and alternately disposed teeth 3 and 3'. These teeth are best formed by milling alternately disposed cuts from opposite sides, as shown at 4 and 4' in Fig. 1. These cuts intersect each other, so that they form the series of alternately offset teeth 3 and 3' whose inner or operative faces, formed by the bottoms of the milled grooves 4 and 4', have the relative positions and angularity which it is desired to impart to the teeth 5 and 5' (Fig. 1) of the saw 6, to produce the necessary set. Thus when the tool is placed upon the edge of the saw, as shown in Fig. 1, and its face 2 is struck with a hammer, the tool teeth 3 will bend or set alternate saw teeth 5 to one side, and at the same time the tool teeth 3' will set the intervening saw teeth 5' to the other side.

Obviously, the width of the tool teeth 3 and 3' must correspond to the pitch or width of the saw teeth 5 and 5', and the relative angularity of the faces 4 and 4' of the tool teeth must correspond to the angle of set desired. However, given a tool of proper proportions, the mechanic need only clamp his saw in a suitable vise and apply the tool to successive portions of the saw's edge, each time striking the face 2 with a hammer. The tools are so small, and can be so cheaply made, that the mechanic can easily carry in his kit one for each type or style of saw that he uses.

It is desirable to provide a gage associated with the tool to insure that each application thereof will produce exactly the same amount of set, so that the set of the saw will be even throughout its entire length. The use of such a gage relieves the operator of the necessity of judging accurately the exact strength of each hammer blow, and therefore renders the tool more successful in inexperienced hands.

In order to render the tool still more successful in the hands of inexpert users, and to positively prevent any injury to the points of the saw teeth, such as might result from the use of the gage 7, if too hard a blow were struck, a preferred form of gage, as shown in Figs. 2 and 3 may be used. This form of gage comprises a plate 7', Fig. 3, having its ends 10 offset downwardly, as shown, and having an elongated rectangular aperture 8' adapted to fit loosely upon the tool body, instead of snugly as in the case of the gage 7 described above. The edges of the body 1 are provided with notches 11, Fig. 2, and the length of the aperture 8' in the gage 7' is such that when the central portion of said gage is straight, as in Fig. 3, it will just fit over the upper portion of the body, but by slightly bowing said central portion, as shown in Fig. 2, the effective length of said aperture 8' is reduced, so that the gage is held in position between the sides of the notches 11. It cannot be removed from the body, except by straightening its central portion, but it can play freely up and down in said notches.

In the use of this form, the body of the tool is held between the thumb and finger of one hand while the hammer blow is struck, the thumb being in such a position, as shown in Fig. 2, that, when the tool has been driven down the desired amount, the gage 7' rises and touches the thumb, thus giving the user an indication that the desired point has been reached. The gage is actuated, as shown, by the engagement of its offset ends 10 with the teeth of the saw, but as said gage only bears lightly and resiliently against the thumb, no injury can be done to the saw teeth. The notches 11 are long enough to prevent the gage from rising to its upper fixed limit of movement in normal use.

In order properly to locate the thumb of the user, so that the gage will always function at the same relative position, the body 1 is provided with some suitable irregularity which may be felt conveniently by the thumb. This can best be made as a circular hole 12 extending through the body 1 in the proper position. Thus by grasping the tool with the thumb centered upon the hole 12, and driving it down upon the saw teeth until the gage 7' is felt to touch the thumb, the proper amount of set is produced, and by repeating the operation throughout the length of the saw without changing the position of the thumb upon the tool, a very accurate and even set of the entire saw is obtained.

I claim:—

1. A saw-setting tool comprising a body adapted to be held in the hand and struck with a hammer, said body having upon its lower edge a plurality of teeth with oppositely and alternately inclined operative faces adapted to contact with and set the teeth of a saw, and a gage movably associated with said body and adapted for contact with both the saw teeth and the hand of the user to indicate the amount of set produced.

2. A saw-setting tool comprising a body adapted to be held in the hand and struck with a hammer, said body having upon its lower edge a plurality of teeth with oppositely and alternately inclined operative faces adapted to contact with and set the teeth of a saw, a gage movably associated with said body and adapted for contact with both the saw teeth and the hand of the user to indicate the amount of set produced, and means for locating the hand upon said body in position for contact with said gage.

3. A saw-setting tool comprising a body adapted to be held in the hand and struck with a hammer, said body having upon its lower edge a plurality of teeth with oppositely and alternately inclined operative faces adapted to contact with and set the teeth of a saw, spaced shoulders formed upon the edges of said body, and a gage comprising a plate adapted for contact with the saw teeth and provided with an aperture of sufficient length to pass over the body and over said shoulders, and said plate being adapted for bending to reduce the effective length of said aperture to cause its ends to be engaged by said shoulders.

In testimony whereof I have signed my name to this specification.

AXEL JOHNSON.